United States Patent
Stout et al.

(10) Patent No.: US 9,175,637 B2
(45) Date of Patent: Nov. 3, 2015

(54) HOT GASKET WITH STAINLESS STEEL

(71) Applicant: Federal-Mogul Corporation, Southfield, MI (US)

(72) Inventors: James Stout, Dexter, MI (US); Jonathan Youngman, Ann Arbor, MI (US)

(73) Assignee: Federal-Mogul Corporation, Southfield, MI (US)

( * ) Notice: Subject to any disclaimer, the term of this patent is extended or adjusted under 35 U.S.C. 154(b) by 0 days.

(21) Appl. No.: 14/486,145

(22) Filed: Sep. 15, 2014

(65) Prior Publication Data

US 2015/0076771 A1    Mar. 19, 2015

Related U.S. Application Data

(60) Provisional application No. 61/877,583, filed on Sep. 13, 2013.

(51) Int. Cl.
| | |
|---|---|
| *F16J 15/08* | (2006.01) |
| *C22C 38/50* | (2006.01) |
| *F02F 11/00* | (2006.01) |
| *B21D 13/00* | (2006.01) |
| *C22C 38/00* | (2006.01) |
| *C22C 38/02* | (2006.01) |
| *C22C 38/44* | (2006.01) |
| *C22C 38/48* | (2006.01) |
| *C22C 38/58* | (2006.01) |
| *F16J 15/06* | (2006.01) |

(52) U.S. Cl.
CPC ............... *F02F 11/00* (2013.01); *B21D 13/00* (2013.01); *C22C 38/001* (2013.01); *C22C 38/02* (2013.01); *C22C 38/44* (2013.01); *C22C 38/48* (2013.01); *C22C 38/58* (2013.01); *F16J 15/064* (2013.01); *F16J 15/0818* (2013.01)

(58) Field of Classification Search
CPC .................... F16J 15/0818; F16J 15/0887
USPC .................................................. 277/590–598
See application file for complete search history.

(56) References Cited

U.S. PATENT DOCUMENTS 3,053,544 A * 9/1962 Gorsica ........................ 277/593
4,471,968 A * 9/1984 Schlaupitz et al. ........... 277/592

(Continued)

FOREIGN PATENT DOCUMENTS

| JP | H05117813 A | 5/1993 |
| JP | H08134595 A | 5/1996 |

OTHER PUBLICATIONS

International Search Report, mailed Jul. 3, 2015 (PCT/US2014/055587).

*Primary Examiner* — Gilbert Lee
(74) *Attorney, Agent, or Firm* — Robert L. Stearns; Dickinson Wright, PLLC

(57) ABSTRACT

A metal gasket for establishing a gas and fluid-tight seal between two members and which is resistant to temperatures of greater than 430° C. and even up to 540° C. is provided. The metal gasket is made of a 200 series stainless steel which includes, by weight percentage: up to 1.0% Silicon, 3.5-5.5% Manganese, up to 0.060% Phosphorus, up to 0.030% Sulfur, 17.5-19.5% Chromium, 0.50-2.00% Molybdenum, 4.0-6.0% Nickel, 0.10-1.00% Niobium, 0.08-0.30% Nitrogen and the remainder of Iron. This particular alloy has been found to provide the gasket with very high mechanical strength, even at temperatures of up to 540° C. Additionally, due to the low nickel content of the 200 series stainless steel, the metal gasket may be made more cost-effectively than other known metal gaskets.

7 Claims, 1 Drawing Sheet

(56) References Cited

U.S. PATENT DOCUMENTS

| | | | |
|---|---|---|---|
| 5,228,702 A | * | 7/1993 | Browne et al. ............... 277/608 |
| 5,558,344 A | * | 9/1996 | Kestly et al. ............... 277/608 |
| 2004/0134824 A1 | * | 7/2004 | Chan et al. ............... 206/524.1 |
| 2004/0156737 A1 | * | 8/2004 | Rakowski ............... 420/53 |
| 2010/0047105 A1 | | 2/2010 | Bergstrom et al. |
| 2011/0024991 A1 | | 2/2011 | Capellmann et al. |
| 2012/0070329 A1 | * | 3/2012 | Kern et al. ............... 420/38 |
| 2012/0118437 A1 | * | 5/2012 | Wang et al. ............... 148/512 |

* cited by examiner

HOT GASKET WITH STAINLESS STEEL

CROSS-REFERENCE TO RELATED APPLICATION

This application claims the benefit of U.S. Provisional Application No. 61/877,583, which was filed on Sep. 13, 2013.

BACKGROUND OF THE INVENTION

1. Field of the Invention

This method relates generally to gaskets for establishing a gas and fluid-tight seal between two members such as exhaust components of an exhaust system for an internal combustion engine or for turbo charger joints of an internal combustion engine.

2. Related Art

Many gaskets for establishing a gas and fluid-tight seal between exhaust joints in an internal combustion engine are made of ASTM A666, Type 301 full hard stainless steel (hereinafter referred to as the "Type 301 Alloy"). Type 301 Alloy steel has a composition which includes, by weight percentage: up to 0.75% Silicon, up to 2.00% Manganese, up to 0.045% Phosphorus, up to 0.030% Sulfur, 16.00-18.00% Chromium, 6.00-8.00% Nickel, up to 0.10% Nitrogen, up to 0.15% Carbon and the remainder of Iron.

Such gaskets are typically formed from sheet of cold rolled material. During the cold rolling process, martensite is formed into the Type 301 Alloy steel material, which provides the resulting gasket with excellent mechanical properties for use as an exhaust gasket. However, in order to increase fuel efficiency, advanced technologies, such as direct injection and turbocharging, are increasingly being used in internal combustion engines. Such technologies result in increased combustion and exhaust temperatures. This may be problematic for exhaust gaskets made of Type 301 Alloy steel because, at temperatures above 430° C., some of the martensite may convert to a comparatively weaker austenite phase, thus reducing the strength of the exhaust gasket and diminishing its sealing abilities. This strength is not recovered after cooling, thereby permanently weakening the gasket.

SUMMARY OF THE INVENTION

One aspect of the present invention provides for a metal gasket for establishing a gas and fluid-tight seal between two members and which may be made cost effectively and is resistant to temperatures of greater than 430° C. and even up to 540° C. The metal gasket is made of a 200 series stainless steel which includes, by weight percentage: up to 1.0% Silicon, 3.5-5.5% Manganese, up to 0.060% Phosphorus, up to 0.030% Sulfur, 17.5-19.5% Chromium, 0.50-2.00% Molybdenum, 4.0-6.0% Nickel, 0.10-1.00% Niobium, 0.08-0.30% Nitrogen and the remainder of Iron. This particular alloy has been found to provide very high mechanical strength, even at temperatures of up to 540° C.

In contrast to Type 301 alloy, which gets its mechanical strength from its martensite content, the material of the gasket of this particular aspect of the invention has a relatively low percentage of martensite even after cold working due to the increased concentrations of manganese, molybdenum, and niobium. Rather, the material of the gasket of this aspect of the present invention gets its strength from solid solution strengthening and precipitation hardening. These properties do not break down at temperatures around 460° C. as martensite does. As such, the gasket has been found to retain its strength even when exposed to temperatures of up to 540° C.

Additionally, due to the low nickel content of the 200 series stainless steel, the metal gasket may be made more cost-effectively than other known metal gaskets.

Another aspect of the present invention provides for a method of making a gasket. The method includes the step of preparing a sheet of metal that is composed of up to 1.0% Silicon, 3.5-5.5% Manganese, up to 0.060% Phosphorus, up to 0.030% Sulfur, 17.5-19.5% Chromium, 0.50-2.00% Molybdenum, 4.0-6.0% Nickel, 0.10-1.00% Niobium, 0.08-0.30% Nitrogen and the remainder of Iron. The method continues with the step of forming an opening in the sheet of metal. The method proceeds with the step of forming an embossment bead in the sheet of metal such that the embossment bead circumferentially surrounds the opening.

BRIEF DESCRIPTION OF THE DRAWINGS

These and other features and advantages of the present invention will be readily appreciated, as the same becomes better understood by reference to the following detailed description when considered in connection with the accompanying drawings wherein.

DESCRIPTION OF THE ENABLING EMBODIMENT

Figure 1:
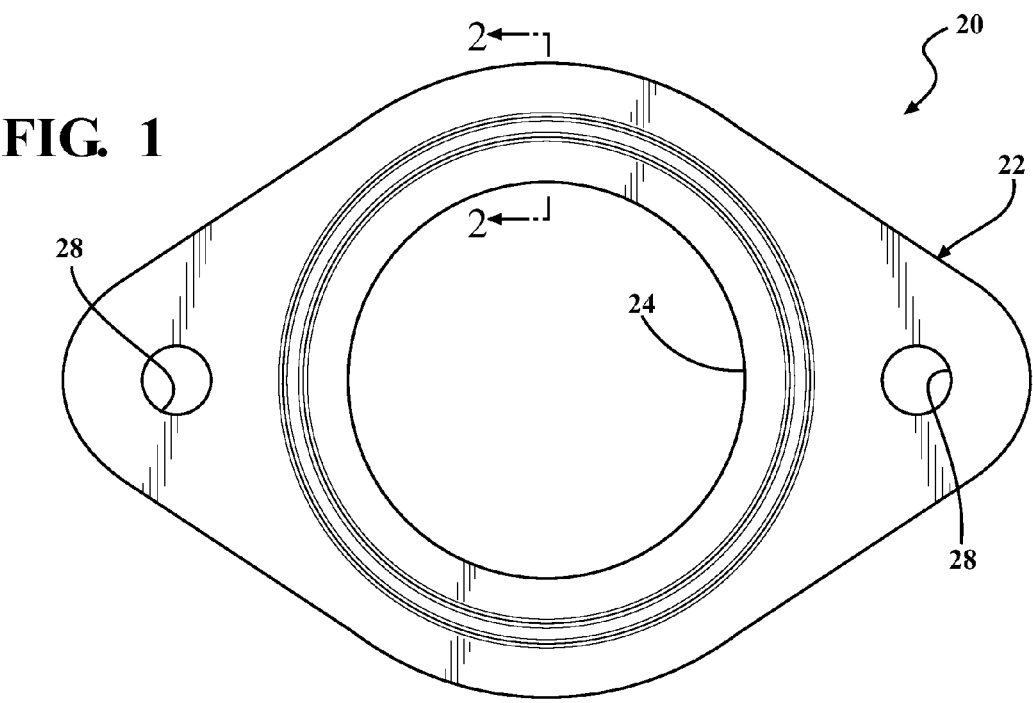
FIG. 1 is a top view of an exemplary embodiment of a gasket.

Referring to the Figures, wherein like numerals indicate corresponding parts throughout the several views, a metal gasket 20 for sealing first and second members is generally shown in FIG. 1. In the exemplary embodiment, the exemplary gasket is a single layer 22 gasket which is configured to seal an exhaust joint (between an engine block and an exhaust manifold) of an internal combustion engine or to seal a joint of a turbocharger or a supercharger for an internal combustion engine. However, it should be appreciated that the gasket 20 may find uses as one or more layers in a multi-layer gasket assembly or for other high temperature sealing applications.

Figure 2:
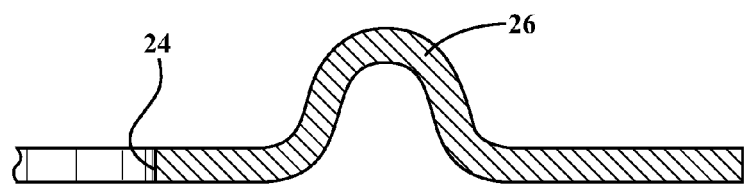
FIG. 2 is a cross-sectional view of the exemplary gasket of FIG. 1 taken along Line 2-2 of FIG. 1.
Figure 3:
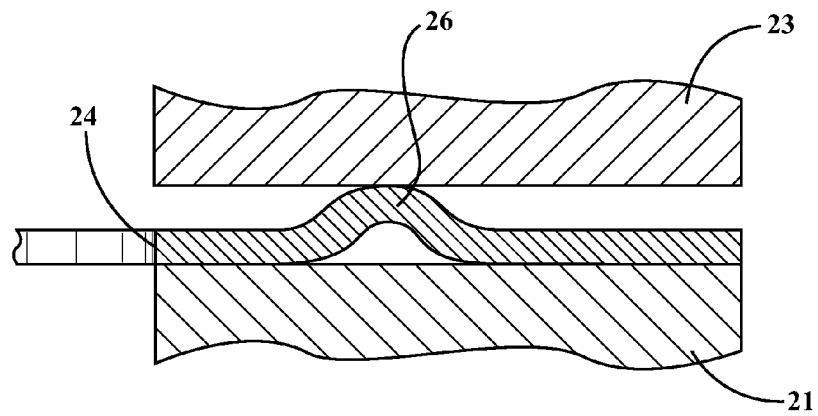
FIG. 3 is a cross-sectional view of the exemplary gasket of FIG. 1 and sandwiched between an engine block and an exhaust manifold of an internal combustion engine.

As shown in FIGS. 1 and 2, the exemplary embodiment of the gasket layer 22 includes an inner periphery 24 which surrounds an opening and an embossment bead 26 which is spaced radially from and circumferentially surrounds the inner periphery 24. That is, the embossment bead 26 surrounds the opening for restricting the escape of gasses that are flowing through the opening. As shown in FIG. 3, the embossment bead 26 is configured to deform elastically when compressed between the first and second members (such as an engine block and an exhaust manifold) to form a spring-like barrier which provides a gas and fluid-tight seal between the first and second members. In the exemplary embodiment, the embossment bead 26 is a full embossment bead. However, it should be appreciated that a half embossment bead (not shown) could alternately be employed. The gasket layer 22 also includes a plurality of mounting bolt holes 28 which are spaced from the inner periphery and from the embossment bead 26.

The gasket layer 22 is formed from a single sheet of metal, and the embossment bead 26 is formed into the gasket layer 22 through an embossing process. The gasket layer 22 is made of a 200 series stainless steel alloy (hereinafter referred to as the "200 Series Alloy") which contains, in weight percent: up to 1.0% Silicon, 3.5-5.5% Manganese, up to 0.060% Phosphorus, up to 0.030% Sulfur, 17.5-19.5% Chromium, 0.50-2.00% Molybdenum, 4.0-6.0% Nickel, 0.10-1.00% Niobium, 0.08-0.30% Nitrogen and the remainder of Iron.

The 200 Series Alloy of the gasket layer 22 has a reduced nickel content as compared to Type 301 Alloy steel, which is conventionally used to make such gaskets. This may provide for cost advantages as compared to gaskets with a higher nickel content due to the high cost of nickel. Additionally, the gasket layer 22 has been found to exhibit a very high mechanical strength, even at temperatures that exceed 430° C. For example, gasket layer 22 formed of the 200 Series Alloy have been found to function with a high mechanical strength at temperatures of up to 540° C. with little to no loss of mechanical strength after cooling. The retention of the mechanical strength at elevated temperatures is attributable at least partially due to the fact that the strength in the material comes from solid solution strengthening and precipitation hardening rather than martensite.

A method of making a gasket layer 22 is also provided. The method includes the step of preparing a sheet of metal that is composed of up to 1.0% Silicon, 3.5-5.5% Manganese, up to 0.060% Phosphorus, up to 0.030% Sulfur, 17.5-19.5% Chromium, 0.50-2.00% Molybdenum, 4.0-6.0% Nickel, 0.10-1.00% Niobium, 0.08-0.30% Nitrogen and the remainder of Iron. The method proceeds with the step of forming an opening in the sheet of metal. The opening may be formed into the sheet metal through, for example, a blanking operation. The method continues with the step of forming an embossment bead 26 in the sheet of metal circumferentially around the opening. The embossment bead 26 is preferably formed into the metal sheet through an embossing process.

Obviously, many modifications and variations of the present invention are possible in light of the above teachings and may be practiced otherwise than as specifically described while within the scope of the appended claims.

What is claimed is:

1. A gasket comprising:
    at least one layer made of metal and including an inner periphery that surrounds an opening; and
    wherein said metal is composed of up to 1.0% Silicon, 3.5-5.5% Manganese, up to 0.060% Phosphorus, up to 0.030% Sulfur, 17.5-19.5% Chromium, 0.50-2.00% Molybdenum, 4.0-6.0% Nickel, 0.10-1.00% Niobium, 0.08-0.30% Nitrogen and the remainder of Iron.

2. The gasket as set forth in claim 1 wherein said layer further includes an embossment bead spaced radially from and circumferentially surrounding said inner periphery.

3. The gasket as set forth in claim 2 further including at least one mounting bolt hole spaced from said embossment bead.

4. The gasket as set forth in claim 1 wherein said at least one layer is only a single layer.

5. A method of making a gasket, comprising the steps of:
    preparing a sheet of metal that is composed of up to 1.0% Silicon, 3.5-5.5% Manganese, up to 0.060% Phosphorus, up to 0.030% Sulfur, 17.5-19.5% Chromium, 0.50-2.00% Molybdenum, 4.0-6.0% Nickel, .10-1.00% Niobium, 0.08-0.30% Nitrogen and the remainder of Iron;
    forming an opening in the sheet of metal; and
    forming an embossment bead in the sheet of metal circumferentially around the opening.

6. The method as set forth in claim 5 wherein the step of forming the opening in the sheet of metal is further defined as blanking an opening in the sheet of metal.

7. The method as set forth in claim 5 wherein the step of forming the embossment bead in the sheet of metal is further defined as embossing an embossment bead into the sheet of metal circumferentially around the opening.

* * * * *